Jan. 23, 1968  J. HABAN  3,364,666
SICKLE BAR ATTACHMENTS FOR LIGHT TRACTORS
Filed Oct. 9, 1964  2 Sheets-Sheet 1
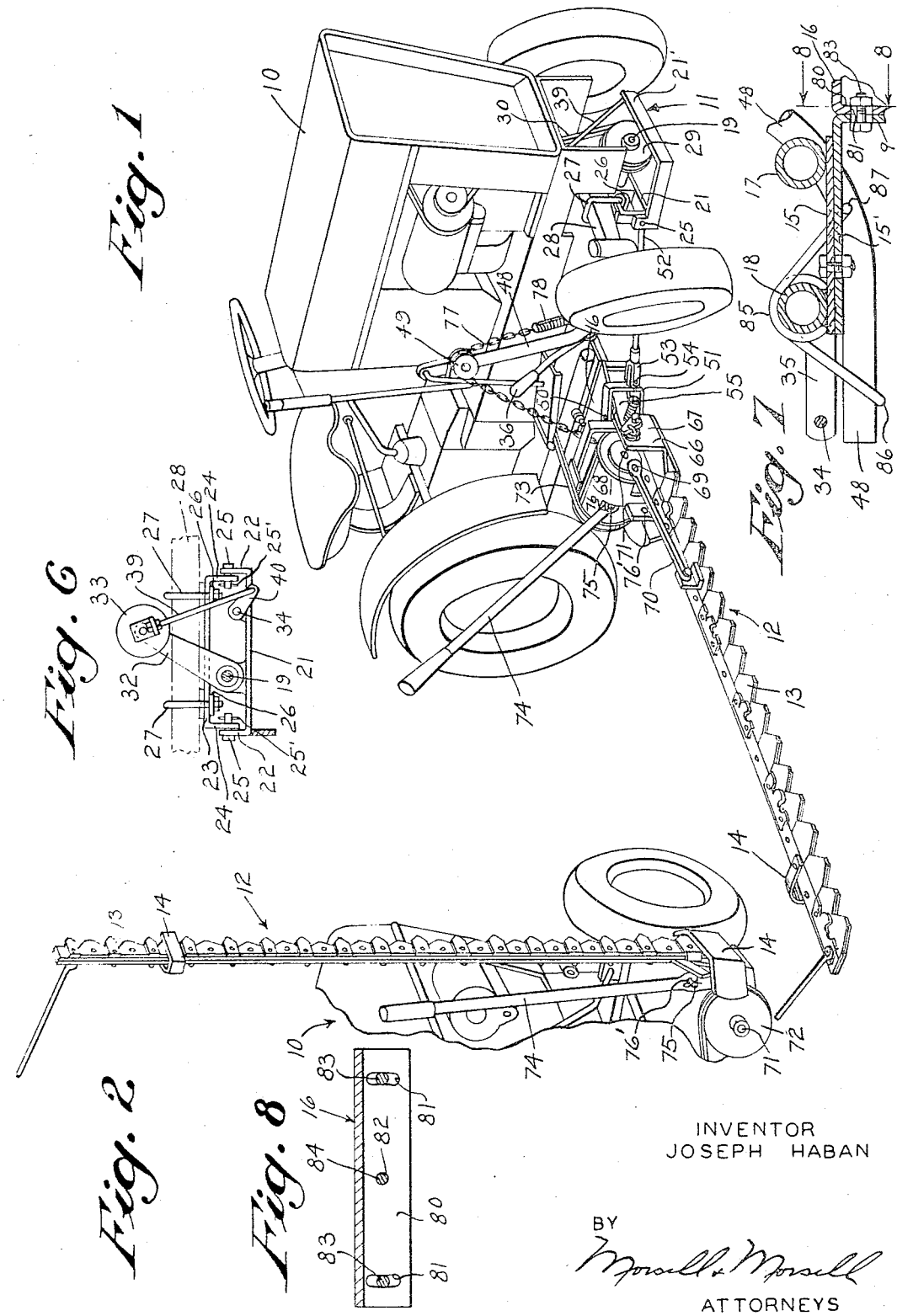
INVENTOR
JOSEPH HABAN
BY
Morsell & Morsell
ATTORNEYS Jan. 23, 1968     J. HABAN     3,364,666
SICKLE BAR ATTACHMENTS FOR LIGHT TRACTORS
Filed Oct. 2, 1964     2 Sheets-Sheet 2
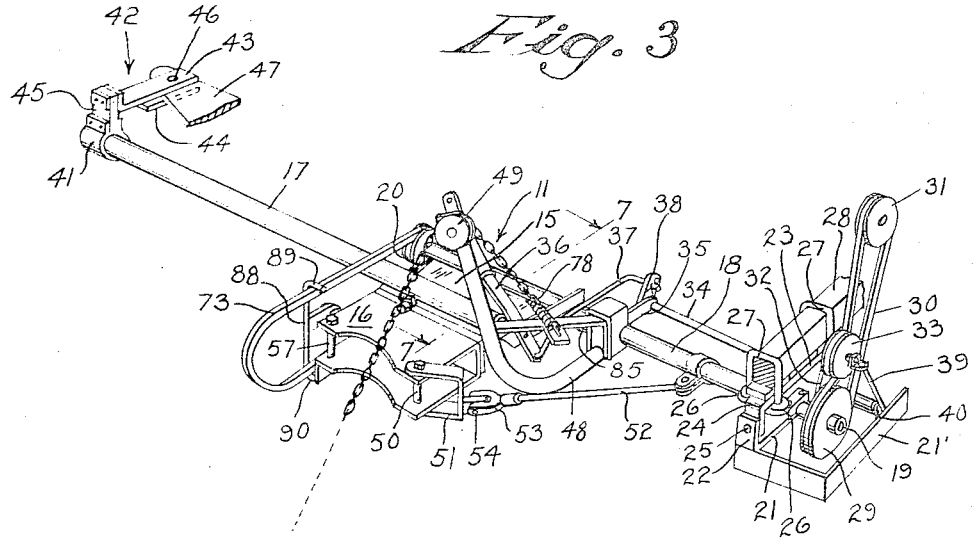
Fig. 3
Fig. 4
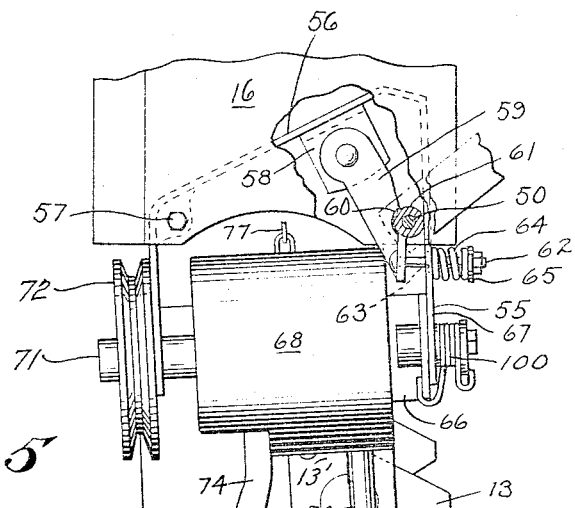
Fig. 5
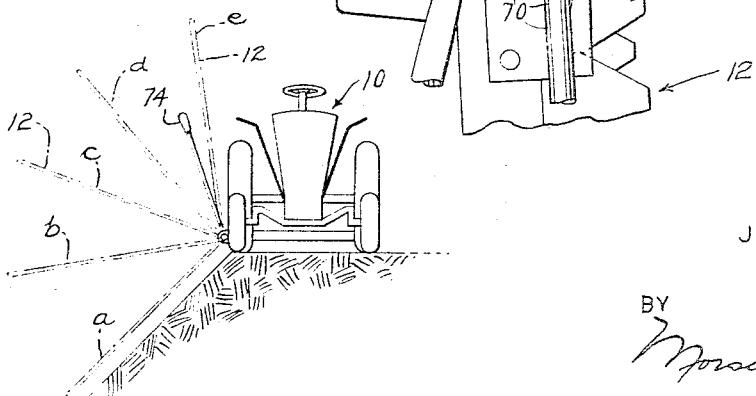
INVENTOR
JOSEPH HABAN
BY
Morsell & Morsell
ATTORNEYS

United States Patent Office 3,364,666
Patented Jan. 23, 1968

3,364,666
SICKLE BAR ATTACHMENTS FOR
LIGHT TRACTORS
Joseph Haban, Mound and Marquette Sts.,
Racine, Wis. 53404
Filed Oct. 9, 1964, Ser. No. 402,847
8 Claims. (Cl. 56—25)

This invention relates to improvements in sickle bar attachments for light tractors.

Heretofore it has only been practical to use a relatively light sickle bar on light tractors, such as 5 or 10 hp. tractors, and such sickle bars have only been capable of obtaining a relatively short stroke.

It is a general object of the present invention to provide a sickle bar attachment which makes it possible to suspend a relatively heavy sickle bar on a light tractor and thereby obtain a full 3" sickle bar stroke for heavy duty service.

A more specific object of the invention is to provide a sickle bar attachment in the form of a unitary device which may be readily attached to or detached from a small tractor, and which, when attached, is strongly supported thereon in a manner which minimizes the transmission of vibration from the sickle bar attachment to the tractor body.

A further object of the invention is to provide a sickle bar attachment having a sickle bar pivotally mounted thereon in a novel manner whereby it may be used and suitably supported in numerous adjusted positions, such as from approximately 45° below horizontal to a near vertical position.

A still further object of the invention is to provide a sickle bar attachment having a novel two-position control handle for varying the position of the sickle bar.

A still further object of the invention is to provide a sickle bar attachment having safety mechanism whereby the sickle bar proper will automatically break rearwardly in case of an emergency, such as the hitting of a rock, to thereby prevent or minimize damage to the mechanism, and will automatically declutch when such emergency occurs.

A further object of the invention is to provide a device wherein the pitch of the cutting fingers may be adjusted to suit conditions.

With the above and other objects in view, the invention consists of the improved sickle bar attachment, and all of its parts and combinations, as set forth in the claims, and all equivalents thereof.

In the accompanying drawings, in which the same reference numerals designate the same parts in all of the views:

FIG. 1 is a perspective view of a light tractor, showing the improved sickle bar attachment connected thereto, the sickle bar being in the conventional horizontal position;

FIG. 2 is a fragmentary perspective view looking from the side and rear and showing the sickle bar in a vertically adjusted position for transport or hedge trimming;

FIG. 3 is a perspective view of the mounting portion of the attachment, parts of the tractor being broken away and being shown in section and the sickle bar proper being omitted;

FIG. 4 is a fragmentary top view illustrating the safety mounting for the sickle bar, whereby it may break rearwardly, parts being broken away and shown in section;

FIG. 5 is a partially diagrammatic view showing the front of a tractor with the sickle bar attachment, the dot and dash lines indicating various alternative positions for the sickle bar from approximately 45° below horizontal to near vertical;

FIG. 6 is an elevational view looking at the front end of the mounting portion, parts being broken away and shown in section;

FIG. 7 is a fragmentary sectional view taken approximately on the line 7—7 of FIG. 3; and FIG. 8 is a fragmentary sectional view taken on the line 8—8 of FIG. 7.

Referring more particularly to the drawings, the numeral 10 designates a light tractor of the type which is usually 5 or 10 hp., the tractor having a sickle bar mounting portion 11 therebeneath (see FIG. 3), which mounting portion carries a sickle bar 12 (see FIG. 1), the latter being of conventional construction as far as operation is concerned, and including a reciprocable knife element 13, and there being supporting shoes 14.

Referring more particularly to FIG. 3, the mounting assembly includes an intermediate mounting plate 15 bolted on top of an auxiliary plate 15' (see FIG. 7), which latter plate has a flange 9 whereby it is connected to and projects from the back wall 80 of a break-away housing 16, the latter being channel-shaped, with the channel opening toward the side of the tractor. The mounting plate 15 carries the forward end of a rear supporting pipe 17 and the rearward end of a front supporting pipe 18. It is to be noted from FIGS. 7 and 8 that the back wall 80 of the break-away housing and the flange 9 have spaced slots 81 and an intermediate bolt hole 82. Bolts 83 extend through the slots 81 and a bolt 84 through the holes 82. By merely loosening the three bolts 83 and 84 and pivoting the break-away housing 16 on the center bolt 84, the break-away housing 16, and hence the angle of the sickle bar assembly 12, may be adjusted to change the pitch of the cutting fingers of the sickle bar to suit various conditions. When cutting fine or matted grass it is desirable to pitch the shear fingers and cutting knives on the sickle bar downwardly.

Suitably supported for rotation in the pipe 18 is a jack shaft 19 having a pulley 20 on its rear end. The forward end of the pipe 18 is welded to a U-bracket 21 having upstanding legs 22 (see FIG. 6). A front tie rod yoke assembly 23 has down-turned ends 24 which are pivotally connected by bolts 25 to the upturned ends 22 of the bracket 21. The bolts 25 have cotter pins 25' thereon which are spaced outwardly on the bolts. In addition, there is play between the legs 22 and 24 whereby there may be movement in a horizontal plane on the axis of the bolts 25 of the bracket 21. This looseness for horizontal movement at the front mounting on two spaced points of support is important in connection with the vibration damping, as will be hereinafter described in greater detail. The yoke assembly has transversely-projecting eyes 26 for receiving the lower ends of U-bolts 27, whereby the yoke assembly may be detachably connected to the front axle 28 of the tractor. Thus any vibration from the sickle bar is transmitted to the ground rather than to the body of the tractor.

A pulley 29 rigidly mounted on the jack shaft 19 is adapted to be connected by an endless drive belt 30 with a pulley 31 driven by the tractor engine. An arm 32, which is swingably mounted at its lower end on the shaft 19 (see FIG. 6), pivotally carries a clutch pulley 33 on its upper end, it being obvious that when the clutch is in the clutching position of FIG. 3 the pulley 29 will be driven from the engine. A clutch-operating rod 34 is rockably supported on the bracket 21 and also in an arm 35. Manipulation of a clutch control handle 36, which is suitably supported on the intermediate mounting plate 15, will act through the rod 37 and crank arm 38 to rock the clutch control rod 34, and then act through a clutch extension rod 39 which is pivotally connected to a crank 40 at the forward end of the rod 34, to move the clutch pulley 33 into and out of clutching engagement.

The rear end of the supporting pipe 17 extends through to the rear of the tractor and is equipped with a metal clamp 41. A hitch assembly 42 having spaced portions 43 and 44 is connected to the clamp 41 by an up-standing, shock-absorbing strip 45 which is preferably formed of reinforced tire-carcass-type rubber. A removable coupling bolt 46 is adapted to detachably connect the hitch 42 to the end of the drawbar plate 47 on the tractor, the latter being inserted between the spaced portions 43 and 44 of the hitch. Thus the rear portion of the sickle bar mounting is resiliently suspended from the drawbar plate of the tractor and is readily detachable therefrom. The resilient suspension minimizes transmission of vibration to the body.

An L-shaped carrier pipe 48 has its inner end suitably supported on the pipe 18 and has an up-standing outer end rotatably supporting a pulley 49. A bolt 50 pivotally connects a clevis 51 to the break-away housing 16, and an adjustable tie rod 52 is connected at its forward end to a clamp on the pipe 18, and its rear end to a clevis 53 which is pivotally connected to the extension of the clevis 51 by a pin 54, with the result that the latter end of the tie rod 52 has a universal connection.

Referring now to FIG. 4, a U-shaped break-away member 55 has a closed inner, angularly-disposed web 56 which is inserted within the break-away housing 16, in the manner shown in FIG. 4, in which position a rear corner of the break-away member is pivotal on a pivot bolt 57. The angular inner web 56 of the break-away member has an outwardly-projecting lug 58 to which a dog 59 is pivoted, said dog having a latching recess 60 for coaction with a sleeve 61 on the bolt 50. A bolt 62 projects through a hole in the outer end of the dog 59 and loosely through a slot 63 in the leg 55 of the break-away member, there being a spring 64 on the outer end of the bolt which is held in position by a nut and washer 65.

It is apparent from the above description that if the sickle bar 12 hits an obstruction such as a rock, it can pivot rearwardly on the bolt 57 against the tension of the spring 64 on the bolt 62, causing disengagement of the latching recess 60 of the dog from the sleeve 61 to permit such pivotal break-away movement of the sickle bar. When the emergency is over the sickle bar may be readily pivoted back into the position of FIG. 4, and the dog will snap itself back into latching position.

One of the forward legs of the break-away member 55 is pivotally connected with a bracket assembly 66 at the inner end of the sickle bar, as at 67. The other leg is pivoted on the pitman drive shaft 71. Thus the sickle bar may be swung in a vertical plane on the axis of the drive shaft 71 to any of various positions such as those illustrated in FIG. 5. The bracket assembly 66 supports a fly wheel housing 68 for the sickle bar, and the sickle bar is driven by means of a crank arm 69 and pitman 70, there being a drive shaft 71 carrying a pulley 72 which is connected by an endless belt 73 with the pulley 20 shown in FIG. 3. The drive for the sickle bar as well as the details of the sickle bar are conventional and will not be further described.

A sickle bar control lever 74, which is suitably pivoted at its inner end, is adapted to be detachably connected in either of two positions in alternate holes 76 or 76' which are spaced upwardly from the pivot. One of these positions is shown in FIG. 1, where removal of a bolt 75 from hole 76 permits pivoting of the lever from the position of FIG. 1 to a position where the bolt 75 may be replaced in the alternative hole 76'. This hole is also shown in FIG. 2 with the bolt connected therein. This is the position of the lever when it is desired to have the sickle bar in a vertical or near vertical position, as the position of the control lever 74 of FIG. 2 is much more convenient for the operator when the sickle bar is in the position of FIG. 2. When the sickle bar is in a horizontal or lower than horizontal position, then the control lever position of FIG. 1 is employed. When the sickle bar is in operative position part of the load is supported by a chain 77. The inner end of the chain is secured to the mounting assembly, as shown in FIG. 3, and the outer end of the chain is adjustably connected to the back of the fly wheel housing 68, there being a spring 78 near the inner end of the chain. The sickle bar will automatically adjust to the contour of the ground, such as one of the positions (a), (b), or (c) of FIG. 5, subject to the action of the springs 78 and 85. When the control handle 74 is pulled upwardly to raise the sickle bar, the outer end of the chain 77 will wind up around the fly wheel housing 68. As before mentioned, for continued usage in a vertical or near vertical position for hedge trimming or for transit, it is convenient to move the control handle from the position of FIG. 1 to the position of FIG. 2, using the alternative bolt hole 76'.

Referring more particularly to FIG. 7, it is to be noted that a coil spring 85 surrounds the tubular frame member 18. One bent end 86 of the spring is engaged beneath the inner horizontal end portion of the carrier pipe 48. The other bent end 87 of the torsion spring is engaged beneath the plate member 15'. This torsional spring distributes the load from the sickle bar assembly through the carrier pipe 48. Also the inertia through the carrier pipe 48, during operation of the sickle bar, will be minimized. This aids in keeping all of the vibration created by the sickle bar in its own self-supporting structure.

It is also to be pointed out that when the sickle bar unit breaks back on the pivot 57 as a result of striking an object such as a stone, a tree, or post, an automatic declutching takes place. This is accomplished automatically because, when pivoting on the bolt 57 takes place, the pulley 72 moves inwardly out of engagement with its drive belt 73. During such movement a belt guide 88 having upper and lower belt-retaining ends 89 and 90 holds the belt in proper position, as shown in FIG. 3, so that the belt is automatically re-engaged by the pulley 72 when the sickle bar assembly 12 is swung back into operative position. This swing back may be accomplished by the operator by merely shifting the tractor into reverse and backing it up a foot or two.

OPERATION

To start the sickle bar in operation the clutch handle 36 is manipulated to swing the clutching pulley 33 into clutching engagement with the belt 30. This will cause transmission of rotation from the engine pulley 31 to the pulley 29. Through the shaft 19, pulley 20 and belt 73 this will be transmitted to the fly wheel shaft 71, which will act through the crank 69 and pitman 70 to cause reciprocation of the sickle bar member 13. During use, adjustments of the sickle bar to the positions (d) and (e) of FIG. 5 may be readily performed by manipulation or adjustment of the control handle 74 in the way heretofore described and graphically illustrated in FIG. 5 and for other positions the sickle bar will adjust itself automatically. As before mentioned, by merely loosening the bolts 83 and 84 (FIG. 8) and pivoting the break-away housing on the center bolt 84, the angle of the sickle bar assembly 12 may be adjusted to change the pitch of the cutting fingers of the sickle bar to suit various requirements or grass conditions.

During use the sickle bar rides on the full-floating inner and outer shoes 14, but the load on the inner shoe 14 is spring-balanced by the spring-tensioned chain 77 and by the torsion spring 85. Simultaneously the load on the outer shoe is balanced by torsion spring 100 (FIG. 4). Tranmission of vibration to the tractor is further minimized because of the torsion spring 85. The sickle bar will, therefore, be self-adjusting to the angle of the ground contour, but can be lever-adjusted for major changes. This provides quick adjustment for steep banks or inclined road shoulders. It is to be noted that the outer shoe 14 (FIGS. 1 and 2) is spaced a substantial distance inwardly from the end of the sickle bar. This leaves the outer end of the sickle bar free and open so that it cannot plug up. These shoes 14 are, of course, adjustably mounted in any conventional manner for the purpose of adjusting the cutting height.

Should the sickle bar hit an obstruction such as a rock, there will be a rearward force exerted on the sickle bar which will cause pivoting on the bolt 57 of FIG. 4, resulting in the disengagement of the dog 59 from the sleeve 61 against the tension of the spring 64. Such break-away action will in most instances prevent serious damage. An automatic de-clutching of the pulley 72 from the belt 73 takes place during such break-away action. When the emergency is over the sickle bar can be readily snapped back into operative position, the dog automatically returning to the position of FIG. 4. Return of the sickle bar can also be effected by shifting the tractor into reverse and backing it up a foot or two.

It is apparent that the improved mounting assembly is strong and furnishes adequate support, in conjunction with the chain suspension, for a relatively heavy-duty sickle bar having a full three-inch stroke. Heretofore this has not been possible on a light tractor. Due to the novel method, wherein the forward end is supported on the front axle and the rear end is resiliently suspended from the drawbar, there is a minimum of transmission of vibration to the body. An examination of FIG. 3 will shown that the entire sickle bar unit is supported from three points on the tractor. The rear support is through the flexible member 45, and the front support is on the two bolts 25 (FIG. 6). As before brought out, these two front points are designed so that there is looseness in a horizontal plane, but more or less snugness in the vertical plane. The flexible rear suspension 45 allows vibration in a horizontal plane, and the looseness for horizontal movement on the bolts 25 at the front mounting also allows for horizontal movement at the front. The loads of the inner and outer shoes 14 are transmitted directly to the upright carrier pipe 48, which in turn is mounted directly on the main frame of the mounting portion. Thus, all vibration from the sickle bar is carried directly into its own self-supporting structure, and transmission of said vibration to the tractor is further minimized by the torsion spring 85, which spring also relieves the load on the carrier pipe 48. Thus, practically all vibration is maintained within the attachment itself.

It is also to be noted from FIG. 4 that applicant employs broad knife clips 13' which are broad enough to overlap at least two cutting knives 13. This structure, particularly with the new broader type lower shear-finger knives now becoming commonly used, prevents clogging, as the broad knife clip maintains uniform clearance between the lower and upper knives.

Various changes and modifications may be made without departing from the spirit of the invention and all of such changes are contemplated as may come within the scope of the claims.

What I claim is:

1. A sickle bar attachment for a tractor comprising a mounting plate for a laterally projecting sickle bar adapted to be positioned beneath a tractor intermediate its length, a tubular frame member secured at its rear end to said mounting plate and projecting forwardly therefrom, a front suspension unit connected to the forward end of said tubular frame member and having means for detachable connection to the front axle of the tractor, a sickle-bar-driving jack shaft adapted to be driven from the tractor rotatable in said tubular frame member, an elongated frame member having its forward end connected to said mounting plate and projecting rearwardly therefrom, and means on the rear end of said last-mentioned frame member for detachable connection with the drawbar plate of a tractor.

2. In a sickle bar attachment for a tractor, a mounting plate adapted to be positioned beneath a tractor intermediate its length, a frame member secured at its rear end to said mounting plate and projecting forwardly therefrom, a front suspension unit connected to the forward end of said frame member and having means for detachable connection to the front axle of the tractor, which suspension unit includes upper and lower elements loosely connected for horizontal play, a frame member having its forward end connected to said mounting plate, flexible suspension means at the rear end of said last-mentioned frame member for detachable connection with the drawbar plate of a tractor, and a sickle bar assembly pivotally connected to said mounting plate and projecting laterally therefrom.

3. A sickle bar attachment for a tractor, comprising a mounting portion adapted to be disposed longitudinally beneath a tractor and having a forward end and a rearward end, transversely spaced legs projecting upwardly from said forward end, a yoke assembly having down-turned legs, bolts pivotally connecting said upwardly-projecting legs to said down-turned legs while providing for play axially of the bolts in a horizontal plane, means including a yieldable suspension for detachably connecting the rearward end of the mounting portion to the rear of a tractor whereby the mounting portion is adapted to be suspended from three points with provision for relative movement in a horizontal plane between it and the tractor, and a sickle bar assembly extending laterally from said mounting portion intermediate the length of the latter.

4. A sickle bar attachment for a tractor, comprising a mounting plate for a sickle bar assembly adapted to be positioned beneath the tractor intermediate its length, an elongated frame member secured at its rear end to said mounting plate and projecting forwardly therefrom, a front suspension unit connected to the forward end of said elongated frame member and having means for detachable connection to the front axle of the tractor, means projecting rearwardly from the mounting plate for detachable connection with the rear of a tractor, an arm having a horizontal inner portion connected to said elongated frame member forwardly of said mounting plate, said arm having an up-standing portion, a torsion spring surrounding said elongated frame member between said arm and mounting plate and having one end engaging said arm and the other end engaging said mounting plate, an elongated flexible suspension member connected at one end to the mounting portion, and guiding means on said up-standing portion of the arm supporting an intermediate portion of said suspension member at an elevation, the outer end of said suspension member being adapted to be connected to said sickle bar assembly to aid in supporting the latter.

5. A sickle bar attachment for a tractor, comprising a mounting plate for a sickle bar assembly adapted to be positioned beneath the tractor intermediate its length, an elongated frame member secured at its rear end to said mounting plate and projecting forwardly therefrom, a front suspension unit connected to the forward end of said elongated frame member and having means for detachable connection to the front axle of the tractor, means projecting rearwardly from the mounting plate for detachable connection with the rear of a tractor, an arm having a horizontal inner portion connected to said elongated frame member forwardly of said mounting plate, said arm having an up-standing portion, an elongated flexible suspension member connected at one end to the mounting portion, and guiding means on said up-standing portion of the arm supporting an intermediate portion of said suspension member at an elevation, the outer end of said suspension member being adapted to be connected to said sickle bar assembly to aid in supporting the latter.

6. A sickle bar attachment for a tractor having a rear drawbar plate with a hole for a coupling bolt comprising a mounting portion adapted to be disposed longitudinally beneath a tractor and having a forward end and a rearward end, means for detachably connecting the forward end of said mounting portion to the front axle of the tractor, means including a hitch assembly for detachably connecting the rearward end of the mounting portion to the tractor drawbar plate, and a sickle bar assembly extending laterally from said mounting portion intermediate the length of the latter, said hitch assembly including connecting means having a bolt hole for registration with the coupling bolt hole in the drawbar plate whereby the hitch assembly may be detachably connected to the tractor drawbar plate through the use of said coupling bolt, and said hitch assembly including a flexible shock absorbing strip having its upper end suspended from said connecting means and having its lower end connected to the rearward end of the mounting portion.

7. In a sickle bar attachment for a tractor, a mounting plate adapted to be positioned beneath a tractor intermediate its length, a frame member secured at its rear end to said mounting plate and projecting forwardly therefrom, a front suspension unit connected to the forward end of said frame member and having means for detachable connection to the front axle of the tractor, a frame member having its forward end connected to said mounting plate, flexible suspension means at the rear end of said last-mentioned frame member for detachable connection with the drawbar plate of a tractor, and a sickle bar assembly pivotally connected to said mounting plate and projecting laterally therefrom.

8. A sickle bar attachment for a tractor comprising a mounting portion adapted to be disposed longitudinally beneath a tractor and having a forward end and a rearward end, transversely spaced legs projecting upwardly from said forward end, a yoke assembly having down-turned legs, bolts pivotally connecting said upwardly-projecting legs to said down-turned legs, means including a yieldable suspension for detachably connecting the rearward end of the mounting portion to the rear of a tractor whereby the mounting portion is adapted to be suspended from three points, and a sickle bar assembly extending laterally from said mounting portion intermediate the length of the latter.

References Cited

UNITED STATES PATENTS

| | | | |
|---|---|---|---|
| 669,259 | 3/1901 | Latimer | 56—282 |
| 2,136,834 | 11/1938 | Baird | 56—25 |
| 2,608,042 | 8/1952 | Paul | 56—25 |
| 2,645,073 | 7/1953 | Dalglish et al. | 56—25 |
| 2,699,025 | 1/1955 | Goss | 56—25 |
| 2,779,145 | 1/1957 | Smith | 56—25 |
| 2,924,928 | 2/1960 | Rhoades et al. | 56—25.4 |
| 2,242,917 | 5/1941 | Martin | 56—25 |
| 2,801,509 | 8/1957 | Salzmann | 56—25 |
| 2,984,960 | 5/1961 | Wathen et al. | 56—25 |
| 2,709,328 | 5/1955 | Schroeppel | 56—25 |
| 2,726,502 | 12/1955 | Hall | 56—25 |
| 1,237,690 | 8/1917 | Pearson | 56—287 |
| 2,620,615 | 12/1952 | Allen | 56—287 |

ABRAHAM G. STONE, *Primary Examiner.*

RUSSELL R. KINSEY, *Examiner.*

M. C. PAYDEN, *Assistant Examiner.*